United States Patent [19]

Ley et al.

[11] Patent Number: 4,522,973

[45] Date of Patent: Jun. 11, 1985

[54] LOW TEMPERATURE CROSSLINKABLE EMULSION

[75] Inventors: David A. Ley, Stamford, Conn.; Herbert Burkhard, Eastchester, N.Y.

[73] Assignee: American Cyanamid Company, Stamford, Conn.

[21] Appl. No.: 529,237

[22] Filed: Sep. 6, 1983

[51] Int. Cl.$^3$ ..................... C08J 39/00; C08K 39/00
[52] U.S. Cl. ............................... 524/555; 525/328.2; 525/379; 525/381; 525/382; 526/304
[58] Field of Search ............... 525/328.2, 379, 381, 525/382; 524/555; 526/304

[56] References Cited

U.S. PATENT DOCUMENTS 4,289,676 9/1981 Czauderna et al. ............ 526/304 X
4,446,280 5/1984 Cady et al. ........................... 525/186

Primary Examiner—Paul R. Michl
Assistant Examiner—S. Babajko
Attorney, Agent, or Firm—Steven J. Hultquist

[57] ABSTRACT

A low temperature crosslinkable emulsion is provided that includes an emulsified, crosslinkable polymer containing repeating units derived from a certain activated ester-containing vinyl monomer, and further includes a crosslinking agent having a plurality of functional groups each capable at low temperature of reacting with the activated ester groups, upon coalescence of micelles of the emulsion. Also provided is a crosslinked coating obtained by curing the emulsion.

12 Claims, No Drawings

4,522,973

LOW TEMPERATURE CROSSLINKABLE EMULSION

TECHNICAL FIELD

This invention relates to a low temperature crosslinkable emulsion. More particularly, this invention relates to such an emulsion in which the polymer that is crosslinked, contains activated ester groups. The present invention further relates to a crosslinked coating formed from the emulsion.

BACKGROUND ART

Crosslinking coating compositions based upon solvent borne, solution polymers, as exemplified by U.S. patent application Ser. No. 346,329, filed Feb. 5, 1982, now abandoned and U.S. patent application Ser. No. 377,504, filed May 12, 1982, now U.S. Pat. No. 4,446,280 are known to us. In Ser. No. 346,329, an activated ester group-containing polymer is crosslinked by reaction with compounds containing at least two primary or secondary amine groups per molecule at temperatures from as low as room temperature to 200° C. In Ser. No. 377,504, a polymer containing repeating units derived from an activated ester-containing monomer, is crosslinked upon curing at room temperature or an elevated temperature, by an amine-terminated triazine resin. However, these compositions are not crosslinkable emulsions.

Currently, low temperature crosslinkable emulsions contain either methylol or aziridine functional groups. Unfortunately, these functional groups present toxicity problems. Due to the hazards associated with these prior art emulsions, there has existed an urgent need for a low temperature, crosslinkable emulsion that is low in evolution of toxic volatile reaction products. Hence, the provision of such an emulsion would fulfill a long felt need and constitute a significant advance in the art.

SUMMARY OF THE INVENTION

It is accordingly one object of the present invention to provide a low temperature crosslinkable emulsion that is low in toxicity and low in evolution of toxic volatile reaction products.

A further object is to provide a crosslinked coating obtained by curing the emulsion.

Additional objects, advantages and novel features of the invention will be set forth in the description which follows, and in part will become apparent to those skilled in the art upon examination of the following or may be learned by practice of the invention.

To achieve the foregoing objects and in accordance with the purpose of the present invention, as embodied and broadly described herein, there is provided a low temperature crosslinkable emulsion. This emulsion includes an emulsified, crosslinkable polymer containing repeating units derived from an activated ester-containing vinyl monomer of the formula

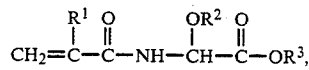

in which the $R^1$ group is H or methyl, and the $R^2$ and the $R^3$ groups are independently selected from alkyls of 1–4 carbon atoms. Any balance of repeating units is derived from one or more copolymerizable ethylenically unsaturated comonomers. The emulsion also includes a crosslinking agent having a plurality of functional groups each capable at low temperature of replacing the $OR^3$ moiety by nucleophilic substitution, upon coalescence of micelles of the emulsion which occurs upon evaporation of water from the emulsion. The crosslinkable polymer contains a sufficient amount of the repeating units derived from the activated ester-containing vinyl monomer, and the crosslinking agent is present in a sufficient amount, to produce a crosslinked polymer upon coalescence.

This emulsion is free from the hazards associated with methylol or aziridine groups. Also provided by the present invention is a crosslinked coating obtained by curing the coating composition.

DETAILED DESCRIPTION

In the present invention, crosslinking utilizes the reaction between an activated ester group and a functional group that in a preferred embodiment is a primary amine. The activated ester group and the primary amine react very rapidly in solvent borne coating systems. Surprisingly, we have discovered that the emulsion system is such that the reaction does not take place to a large extent until coalescence of micelles of the emulsion which occurs upon evaporation of water therefrom. However, upon coalescence, the reaction readily occurs to give a crosslinked polymer. The significance of this discovery becomes plain when it is considered that in a solvent borne coating system, the reaction is so rapid that coatings must be prepared within minutes of actually mixing the reactants; whereas, in the emulsion system of the present invention, formulations can be prepared that, on the one hand, are stable for more than about five months, and yet, on the other hand, still can undergo crosslinking within hours following coalescence. Thus, the emulsion of the present invention makes commercially practicable a composition useful, for example, for coating or non-woven binder applications, in which a crosslinkable component and the crosslinking component have been premixed for later eventual use.

The essential components of the emulsion of this invention are an emulsified polymer bearing particular activated ester groups, and a certain crosslinking agent. A necessary feature of the polymer is the presence of repeating units derived from an activated ester-containing vinyl monomer of the formula

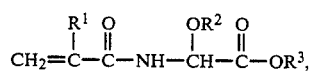

in which the $R^1$ group is H or methyl, and the $R^2$ and $R^3$ groups are independently selected from alkyls of 1–4 carbon atoms. Suitable monomers include methyl acrylamidoglycolate methyl ether (MAGME), ethyl acrylamidoglycolate ethyl ether, butyl acrylamidoglycolate butyl ether, methyl acrylamidoglycolate ethyl ether and ethyl acrylamidoglycolate methyl ether, with MAGME being preferred. Of course, the monomer could be a mixture of monomers such as a mixture of MAGME, butyl acrylamidoglycolate methyl ether, methyl acrylamidoglycolate butyl ether and butyl acrylamidoglycolate butyl ether, with, for example, the major portion of the mixture being MAGME with an overall methyl/butyl ratio of about 3:1.

These monomers are suitably formed by the procedures set forth in U.S. patent application Ser. No. 346,329, which is discussed earlier, and U.S. patent application Ser. No. 377,505, filed May 12, 1982, now U.S. Pat. No. 4,443,623 the revelant portions of the disclosures of which are hereby incorporated by reference into this description. Additionally, attention is invited to two illustrative procedures set forth later in this description of the present invention.

The crosslinking agent is characterized by the presence of a plurality of functional groups each capable at low temperature of replacing the $OR^3$ moiety by nucleophilic substitution, upon coalescence of the micelles. This nucleophilic substitution reaction gives as the reaction byproduct an alcohol that is low in toxicity, and thereby avoids dangers associated with the prior art, low temperature crosslinkable emulsions described earlier.

The amount of the crosslinker in the emulsion and the weight percent of the repeating units derived from the activated ester-containing monomer making up the polymer, may each vary widely and are generally determined by a number of factors such as the extent of crosslinking desired and the particular reactants employed. In any event, the crosslinker is used in a sufficient amount and the polymer contains a sufficient amount of these repeating units, to create a crosslinked polymer upon coalescence. For coatings or adhesive applications, the polymer should contain between about 1 and 15 weight percent of these repeating units, with between about 2 and 10 weight percent being preferred. Generally, the functional groups of the crosslinker in the emulsion will range from about 0.5 to 10 equivalents based on the activated ester functionality of the polymer employed. Preferably, about 0.8 to 1.2 equivalents of amine groups are used.

As explained, the polymer must contain repeating units derived from the activated ester-containing vinyl monomer. Any balance of repeating units is derived from one or more copolymerizable ethylenically unsaturated monomers. Suitable monomers useful herein include $C_1$-$C_8$ alkyl esters of acrylic acid, $C_1$-$C_8$ alkyl esters of methacrylic acid, styrene, alpha-methyl styrene, vinyl acetate, 1,3-butadiene, ethylene, cyclopentadiene, acrylonitrile and vinyl chloride. Particularly preferred monomers for coatings are the alkyl acrylates, the alkyl methacrylates, vinyl acetate and styrene. Especially preferred monomers for adhesive applications are styrene, 1,3-butadiene, vinyl acetate and ethylene. Preferably, vinyl acetate copolymers may suitably incorporate a carboxylic acid in the polymer backbone to ensure adequate compatibility of the copolymer with the crosslinker.

The activated ester-containing vinyl monomers may be polymerized, or more preferably copolymerized with these other monomers, according to conventional emulsion polymerization techniques using conventional initiators, temperatures and other reaction conditions. These conventional polymerization procedures include the two-stage polymerization technique exemplified below for Polymer C and Polymer D. With respect to this two-stage polymerization procedure, we have discovered that initial film properties show improved solvent resistance, such as resistance to an organic solvent like methyl ethyl ketone, when all the activated ester group-containing monomer is included in the first-stage monomer charge and is therefore placed entirely in the "core" of the micelle. This advantage does, however, disappear if too much time elapses between admixing the crosslinker and the crosslinkable polymer and actually applying the resulting formulation as a coating. Hence, if this film property is desired, a preferred procedure for forming the emulsion includes using a two-stage emulsion polymerization technique, in which all the activated ester group-containing monomer is included in the first-stage monomer charge, and it is preferred to apply coatings within a short time, i.e., less than about 24 hours, of mixing the polymer and crosslinker.

The crosslinkable polymer produced by these polymerization techniques, is cured by reaction with the crosslinking agent described earlier, at low temperature. By "low temperature" is meant from about ambient temperature up to and including about 50° C., and, in certain instances as is explained later, up to and including about 100° C. The crosslinker is typically monomeric, and should be water soluble for maximum separation from the activated ester group in the micelles. In a preferred embodiment, the crosslinker is characterized by a plurality of primary amine groups, with two or three primary amine groups being especially preferred. Typical amines useful as the crosslinker include ethylenediamine, propanediamine, butanediamine, hexanediamine, 4,7-dioxodecane-1,10-diamine (DODA), bis and tris 2-aminopropyl ethers of diols and triols, and a sterically unhindered trifunctional amine such as N,N'-bis(6-aminohexyl)-2-[(6-aminohexyl)amino] butanediamide.

The butanediamide compound is prepared by the following procedure: Dimethyl maleate (72 g, 0.5 moles) is added over a 2-3 hour period to a solution of 1,6-hexanediamine (174 g, 1.5 moles) in toluene (360 g) at 75°-80° C. The reaction temperature rises from 80° to 110° C. under reflux conditions. After the addition is completed, methanol is distilled at a reaction temperature of 120°-125° C. Additional toluene (320 g) is added to maintain reaction volume. The reaction may be followed by amine titration or by disappearance of the methyl ester in the $^1H$ NMR spectrum. After the reaction is complete, toluene is removed under vacuum (50°-70° C., 15-20 mm Hg) to give the desired compound as a viscous liquid which solidifies on standing.

The emulsion of the present invention is readily cured as a coating by exposure to an appropriate low temperature for an adequate period of time. The speed of curing depends upon factors including the particular temperature at which curing is carried out, the components forming the emulsion, and the presence or absence of an accelerator.

By selection of a particular activated ester-containing monomer and/or of a certain crosslinker, an emulsion in accordance with the invention can be tailored to have, for example, a certain cure temperature within the low temperature range, a particular speed of cure, and/or a desired shelf life. For instance, when MAGME is used as the monomer, room temperature cures are possible, with the cure temperature perhaps ranging up to and including about 50° C.; whereas, a higher alkyl ester such as the butyl, will require some heating even up to and including about 100° C., for crosslinking to occur. Depending upon the particular polymer used, the speed of cure of a sterically unhindered trifunctional amine is substantially faster than or about equivalent to the speed of cure provided by a diamine. As discussed in Examples 7-10, which are set forth later, formulations have been prepared from both a trifunctional amine and from diamines, that are stable for more than 5 months at ambient temperature. Primary amines attached to secondary carbons are less reactive and may require some heating for crosslinking to occur.

The emulsion of the present invention may contain such other ingredients as are customarily employed in coating compositions. Such ingredients include pigments, and flow additives and modifiers.

Coating and non-woven binder applications of the emulsion are expected to include utility in floor coatings, wood coatings and trade sale paints, and utility as nonwoven binders in textile applications.

In the illustrative procedures which follow, all parts and percentages are by weight unless otherwise specified.

Preparation of Methyl Acrylamidoglycolate Methyl Ether (MAGME)

To a three-necked flask equipped with a stirrer and an extractor filled with a molecular sieve drying agent is added 300 parts acrylamidoglycolic acid, 3000 parts methanol, 0.05 parts phenothiazine, 4.5 parts 98% sulfuric acid and 200 parts chloroform. The mixture is heated to reflux and the distillate is allowed to pass through the extractor for 6½ hours. The mixture is cooled and allowed to stand for 16 hours at which point the mixture is warmed to about 40° C., 19 g of sodium carbonate is added, and the solution is stirred for 2½ hours. The mixture is filtered and vacuum stripped of solvent. The solid residue is extracted with chloroform. Diethyl ether is added to the extract and a polymeric mass precipitates which is discarded. The remaining extract is stripped of solvent to yield 264.2 parts of crude MAGME.

Preparation of Butyl Acrylamidoglycolate Butyl Ether

One hundred parts of acrylamidoglycolic acid, 517 parts butanol, 1 part conc. sulfuric acid and 0.1 part monomethyl ether of hydroquinone are mixed in a flask equipped with a Dean Stark water trap and a stirrer. The mixture is heated until homogeneous. After 5-10 minutes, 100 ml of toluene is added and the mixture is brought to reflux and held 5 hours until the theoretical amount of water is collected by azeotrope. The toluene and excess butanol are removed under vacuum to yield 173 parts of the crude product.

Preparation of Polymer A. Acrylic Emulsion Polymer EA/MMA/MAGME, 42% Solids 55/40/5

A conventional emulsion polymerization technique is employed as now described.

|  | Parts by Weight |
| --- | --- |
| Reactor Charge |  |
| Aerosol ® A-102* (30%) | 26.6 |
| Ammonium persulfate | 0.8 |
| Deionized Water | 560 |
| Monomer Mixture |  |
| Ethyl acrylate | 220 |
| Methyl methacrylate | 160 |
| MAGME | 20 |
| Post Addition |  |
| Aerosol ® A-102* (30%) | 13.4 |

*Disodium ethoxylated alcohol half ester of sulfosuccinic acid, available from American Cyanamid.

The reactor charge is purged with $N_2$ for 15 minutes and warmed to 60° C. Ten percent of the monomer mixture is added dropwise at 60° C. After waiting for initiation, the remainder of the monomer mixture is added dropwise over a 3 hour period. Aerosol ® A-102 surfactant is post added, and the resulting emulsion is cooled and passed through a coarse filter to remove any coagulum.

Preparation of Polymer B. Vinyl Acetate Emulsion Polymer VA/EA/MAGME/Itaconic Acid, 44% Solids 63/23/13/1

|  | Parts by Weight |
| --- | --- |
| Reactor Charge |  |
| Deionized Water | 72 |
| Potassium Persulfate (5% solution) | 20 |
| Sodium Bicarbonate | 0.8 |
| Aerosol ® A-102 | 5.6 |
| t-Dodecyl Mercaptan | 0.2 |
| Co-Initiator Charge |  |
| Diammonium Phosphate | 1.4 |
| Sodium Metabisulfite | 32 |
| Pre-Emulsified Monomer Mixture |  |
| Vinyl Acetate | 132 |
| Ethyl Acrylate | 50 |
| Itaconic Acid | 2 |
| Deionized Water | 95 |
| Sodium Metabisulfite (2% solution) | 20 |
| Methanol | 10 |
| Aerosol ® OT-75[1] | 2.6 |
| Delayed Monomer Addition Mixture |  |
| MAGME | 26.6 |
| Deionized Water | 20.0 |
| Surfonic ® N-95[2] | 2.0 |

[1]Sodium dioctylsulfosuccinate, available from American Cyanamid.
[2]Alkyl aryl polyethylene glycol ether, available from Jefferson Chemical Co.

The deionized water (72 parts) is heated to boiling under a $N_2$ purge. The purged water is cooled, the remaining components of the reactor charge are added, and the combined reactor charge is purged with $N_2$ for an additional 15 minutes. Afterwards, the reactor charge is heated to 65° C., and the co-initiator charge is introduced just prior to addition of the purged, pre-emulsified monomer mixture. Addition is started at a rate of 2 parts per minute. The addition is stopped when polymerization is initiated as indicated by a blue tint in the reactor. At this time, the delayed monomer addition mixture is combined with the remainder of the pre-emulsified monomer mixture, and the combined monomer mixture is introduced over 3 hours. The latex is then held at 65° C. for 1 hour, cooled and passed through a coarse filter to remove any coagulum.

EXAMPLE 1

Fifty parts of Polymer A latex is combined with 1.06 parts of a 50% aqueous solution of 4,7-dioxodecane-1,10-diamine (DODA).

EXAMPLE 2

The procedure of Example 1 is followed except that 50 parts of Polymer A latex is combined with 0.70 parts of a 50% aqueous solution of 1,6-hexanediamine (HMDA).

EXAMPLE 3

The procedure of Example 1 is followed except that 50 parts of Polymer A latex is combined with 1.7 parts of a 50% aqueous solution of N,N'-bis(6-aminohexyl)-2-[(6-aminohexyl)amino] butanediamide.

EXAMPLES 4–6

The procedures of Examples 1, 2 and 3 are followed except that 50 parts of Polymer B latex is combined with 1.8 parts of a 50% aqueous solution of DODA, 1.14 parts of a 50% aqueous solution of HMDA, or 1.8 parts of a 50% aqueous solution of the butanediamide, respectively.

The emulsions of Polymer A, Polymer B, and Examples 1 through 6 are drawn down on glass plates and cured at the temperatures shown in Tables 1 and 2. A 20 minute cure time is used for 100° C., 150° C. and 175° C., and a 4 hour cure time is used at room temperature. The free films obtained are cut into 0.5 inch squares and immersed in water or methyl ethyl ketone for about 24 hours to test solvent resistance. The results are shown in Tables 1 and 2. In these tables, "dissolved" means completely dissolved, "fragments" means the film did not remain intact but did not completely dissolve, and "swollen" means that the film remained intact but became swollen.

TABLE 1

Film Properties of MAGME - Acrylic Latex

| | Cure Temp. (°C.) | Resistance Properties | |
|---|---|---|---|
| | | Water | Methyl Ethyl Ketone |
| Polymer A | RT | Opaque | Dissolved |
| | 150 | Opaque | Dissolved |
| | 175 | Slight Haze | Fragments |
| Example 1 | RT | Haze | Fragments |
| | 100 | Slight Haze | Swollen |
| Example 2 | RT | Opaque | Fragments |
| | 100 | Haze | Swollen |
| Example 3 | RT | Clear | Swollen |
| | 100 | Clear | Swollen |

TABLE 2

Film Properties of MAGME - Vinyl Acetate Latex

| | Cure Temp. (°C.) | Resistance Properties | |
|---|---|---|---|
| | | Water | Methyl Ethyl Ketone |
| Polymer B | RT | Haze | Extreme Swelling |
| | 100 | Opaque | Extreme Swelling |
| Example 4 | RT | Opaque | Swollen |
| | 100 | Haze | Swollen |
| Example 5 | RT | Opaque | Swollen |
| | 100 | Haze | Swollen |
| Example 6 | RT | Haze | Swollen |
| | 100 | Clear | Swollen |

Preparation of Polymer C. Two-Stage Polymerization, MAGME: 100/0 (core/shell)

A preferred procedure for preparing an acrylic emulsion copolymer is followed, as now described.

| | Parts by Weight |
|---|---|
| Reactor Charge | |
| AEROSOL ® A-102 (30%) | 2.0 |
| Deionized Water | 211.0 |
| First-Stage Monomer Charge | |
| AEROSOL ® A-102 (30%) | 19.0 |
| Deionized water | 168.0 |
| MAGME | 20.0 |
| Ethyl acrylate | 104.0 |
| Methyl methacrylate | 76.0 |
| First-Stage Catalyst Charge | |
| Ammonium persulfate | 2.2 |
| Deionized water | 51.0 |
| Second-Stage Monomer Charge | |
| AEROSOL ® A-102 (30%) | 19.0 |
| Deionized water | 91.0 |
| Ethyl acrylate | 116.0 |
| Methyl methacrylate | 84.0 |
| Second-Stage Catalyst Charge | |
| Ammonium persulfate | 42.0 |
| Deionized water | 1.8 |

The reactor charge is heated to 60° C. under a nitrogen sparge. Ten parts of the first-stage monomer charge and 9.4 parts of the first-stage catalyst charge are added thereto, and the reaction is held at 60° C. until polymerization is initiated. The balance of the monomer and catalyst is added in separate streams over a 90 minute period. After completion of the monomer addition, the reaction is held at 60°–65° C. for 1 hour. The second stage monomer and catalyst charges are added in separate streams over a second 90 minute period. The reaction is held for an additional 30 minutes after completion of the monomer charge. The reaction is cooled to room temperature. The resulting emulsion has 42% solids. All of the MAGME has been placed in the core of the micelles.

Preparation of Polymer D. Two-Stage Polymerization, MAGME: 50/50 (core/shell)

The procedure given for Polymer C is followed, except that 10 parts MAGME monomer is added with each monomer charge.

EXAMPLE 7

1.28 Parts of a 50% by weight aqueous solution of DODA is added dropwise to 50 parts of Polymer C latex (42% solids). Thorough mixing gives a stable, one package, room temperature cure latex system. The formulated latex may be stored more than 5 months at room temperature before applying.

EXAMPLE 8

The procedure of Example 7 is followed, except that 50 parts of Polymer D latex is used. The formulated latex may be stored at room temperature for more than 5 months before applying.

EXAMPLE 9

The procedure of Example 7 is followed, except that 0.85 parts of 50% by weight aqueous solution of HMDA is added in place of DODA. The resultant composition is stable at room temperature for more than 5 months.

EXAMPLE 10

The procedure of Example 9 is followed, except that 50 parts of Polymer D latex is used. The resultant coating composition may still be applied after storing at room temperature for more than 5 months.

TABLE 3

Effect of MAGME Location on Film Properties
Substrate: Free Films
Cure: Four Hours at Room Temperature

| | Crosslinker | MEK Swelling Ratio[1] |
|---|---|---|
| Polymer C | None | 5.6 |
| Polymer D | None | 10.4 |
| Example 7 | DODA | 4.5 |

TABLE 3-continued

Effect of MAGME Location on Film Properties
Substrate: Free Films
Cure: Four Hours at Room Temperature

| | Crosslinker | MEK Swelling Ratio[1] |
|---|---|---|
| Example 8 | DODA | 7.6 |
| Example 9 | HMDA | 4.2 |
| Example 10 | HMDA | 5.6 |

[1]Area of free film after 24 hr. immersion in methyl ethyl ketone divided by original area of free film.

The above examples are illustrative of our invention. It is to be understood that these examples are not in any way to be interpreted as limiting the scope of the invention. Rather, it is intended that the scope of the invention be defined by the claims set forth below.

We claim:

1. A low temperature crosslinkable emulsion comprising (a) an emulsified, crosslinkable polymer containing repeating units derived from an activated ester-containing vinyl monomer of the formula

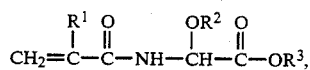

wherein the $R^1$ group is H or methyl, and the $R^2$ and $R^3$ groups are independently selected from alkyls of 1–4 carbon atoms; with any balance of repeating units derived from one or more copolymerizable ethylenically unsaturated comonomers; and (b) a crosslinking agent having a plurality of primary amine groups each capable at low temperature of replacing the $OR^3$ moiety by nucleophilic substitution, upon coalescence of micelles of said emulsion which occurs upon evaporation of water therefrom;

wherein the crosslinkable polymer contains a sufficient amount of said repeating units derived from said activated ester-containing vinyl monomer, and said crosslinking agent is present in a sufficient amount, to produce a crosslinked polymer upon said coalescence.

2. The emulsion of claim 1, wherein the crosslinkable polymer contains about 1–15 weight percent of said repeating units derived from said activated ester-containing vinyl monomer.

3. The emulsion of claim 1, wherein the crosslinkable polymer contains about 2–10 weight percent of said repeating units derived from said activated ester-containing vinyl monomer.

4. The emulsion of claim 1, wherein said activated ester-containing vinyl monomer is methyl acrylamidoglycolate methyl ether.

5. The emulsion of claim 1, wherein said crosslinking agent has three primary amine groups.

6. The emulsion of claim 5, wherein said crosslinking agent is N,N'-bis(6-aminohexyl)-2-[(6-aminohexyl)amino] butanediamide.

7. The emulsion of claim 1, wherein said crosslinking agent has two primary amine groups.

8. The emulsion of claim 7, wherein said crosslinking agent is 4,7-dioxodecane-1,10-diamine.

9. The emulsion of claim 7, wherein said crosslinking agent is 1,6-hexanediamine.

10. The emulsion of claim 1, wherein substantially all the activated ester-containing vinyl monomer has been placed into the core of the micelles.

11. A crosslinked coating obtained by curing the emulsion of claim 1.

12. A crosslinked coating obtained by applying the emulsion of claim 10 as a coating within a short time after forming said emulsion by the admixture of the polymer and said crosslinking agent, and then curing the applied emulsion.

* * * * *